United States Patent [19]

Yamanaka

[11] Patent Number: 4,500,191
[45] Date of Patent: Feb. 19, 1985

[54] PHOTOGRAPHY MODES SWITCHABLE CAMERA

[75] Inventor: Akira Yamanaka, Sakai, Japan

[73] Assignee: Minolta Camera Kabushiki Kaisha, Azuchi, Japan

[21] Appl. No.: 433,613

[22] Filed: Oct. 12, 1982

[30] Foreign Application Priority Data

Oct. 15, 1981 [JP] Japan .................. 56-165416

[51] Int. Cl.³ ............................. G03B 15/05
[52] U.S. Cl. .................. 354/418; 354/419; 354/422
[58] Field of Search .............. 354/27, 32–35, 354/60 F, 46, 127, 128, 50, 197, 418–420, 422, 421, 423

[56] References Cited

U.S. PATENT DOCUMENTS

| | | | |
|---|---|---|---|
| 3,824,606 | 7/1974 | Yoshiyama | 354/50 |
| 3,836,934 | 9/1974 | Suzuki et al. | 354/197 |
| 3,925,797 | 12/1975 | Ettischer | 354/197 |
| 4,078,240 | 3/1978 | Kaneko et al. | 354/33 |
| 4,407,573 | 10/1983 | Wakabayashi et al. | 354/33 |

FOREIGN PATENT DOCUMENTS 56-87028  7/1981  Japan ......................... 354/32

*Primary Examiner*—William B. Perkey
*Attorney, Agent, or Firm*—Wolder, Gross & Yavner

[57] ABSTRACT

A camera including an objective lens device whose focal length is manually changeable, is automatically switched from a natural light photography mode to a flash photography mode when a low brightness condition detecting means generates a low brightness signal upon detection of a low brightness condition. A control means causes the detecting means to generate the signal at different brightness conditions in accordance with the change in the focal length of the objective lens device so that the automatic switching of the camera to the flash photography mode is effected with a higher brightness condition in the case of a longer focal length.

7 Claims, 4 Drawing Figures

PHOTOGRAPHY MODES SWITCHABLE CAMERA

BACKGROUND OF THE INVENTION

1. Field of the Invention

The present invention relates to a camera switchable between a natural light or daylight photography mode (wherein the shutter speed (and the diaphragm aperture in the case of a programmed shutter) is automatically controlled in accordance with the light from an object to be photographed under the illumination of natural light thereby providing a proper exposure), and a flash photography mode (wherein an electronic flash is fired and the shutter speed (and the diaphragm aperture in the case of a programmed shutter) is controlled to values suitable for flash photography).

2. Description of the Prior Arts

A device is known which warns blur-occurring when a shutter speed automatically controlled in accordance with an object's brightness is anticipated to be so low as to cause blur in the picture due to the movement of the hand-held camera upon photographing. The blur occurs more frequently in photography with a telephoto lens than in photography with a standard lens. A Japanese Laid-Open Patent Publication Sho No. 52-135728 discloses a warning device which is adapted for use with a camera having an objective lens with its focal length being selectively changed in substance, and in which the reference shutter speed for the warning of the blur-occurring is automatically changed in conjunction with selection of the focal length of the objective lens. However, since the disclosed warning device only makes warning of a blur-occurring shutter speed, the user, in response to the warning, must change the diaphragm setting to a larger aperture to obtain a higher shutter speed or switch the camera to enable flash photography.

U.S. Pat. Nos. 4,112,442 and 3,504,604 show photography mode switching devices which switch camera operational condition from the natural light photography mode to the flash photography mode when the brightness of an object or scene to be photographed is lower than a given reference level. In such switching devices, however, the reference level for switching to the flash photography mode can not be changed in conjunction with change of the focal length of an objective lens.

SUMMARY OF THE INVENTION

It is an object of the present invention to provide a camera which includes an objective lens device the focal length of which is manually changeable and which causes the chance of blur occurrence to be lessened even in the case of a long focal length.

To accomplish this object, a camera of the present invention is provided with an objective lens device, a low brightness condition detecting means, a switching means and a control means. The switching means switches the camera from a natural light photography mode to a flash photography mode in response to a low brightness signal generated by the detecting means. The focal length of the objective lens device is made manually changeable, and the control means causes the detecting means to generate the signal at different brightness conditions in accordance with the change in the focal length.

According to the camera of the present invention, the detecting means generates the signal in a higher brightness condition when the focal length of the objective lens device is changed to a longer focal length. Namely, in the case of a long focal length, the flash photography mode is automatically set even in a higher brightness condition. Consequently the chance of blur occurrence is lessened even in the case of long focal length.

The above and other objects and features of the present invention will become more apparent from the following description of a preferred embodiment of the present invention taken in conjunction with the accompanying drawings.

DETAILED DESCRIPTION OF THE PREFERRED EMBODIMENTS

Figure 1:
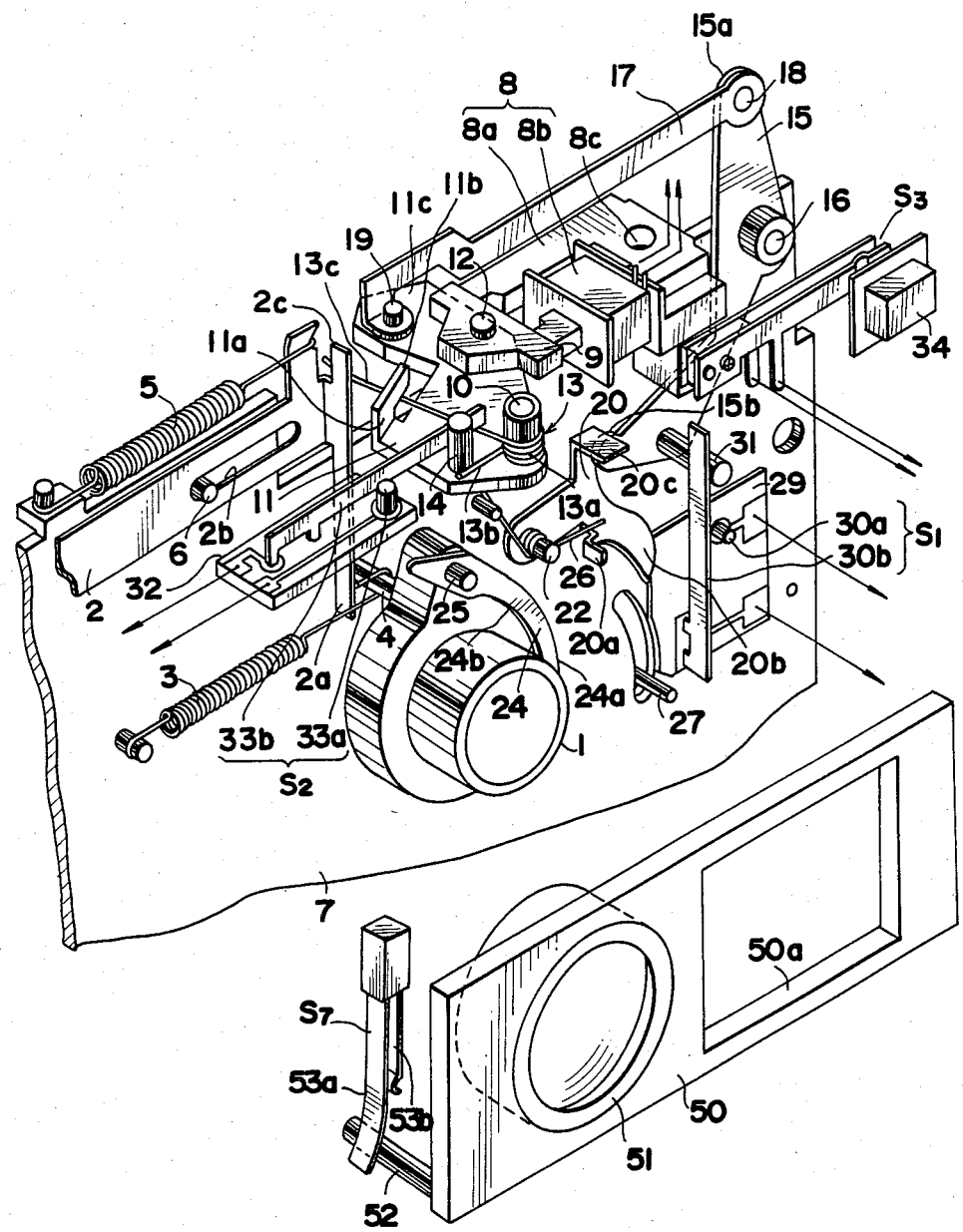
FIG. 1 is a perspective view of an embodiment of the present invention set to a natural light photography mode.
Figure 2:
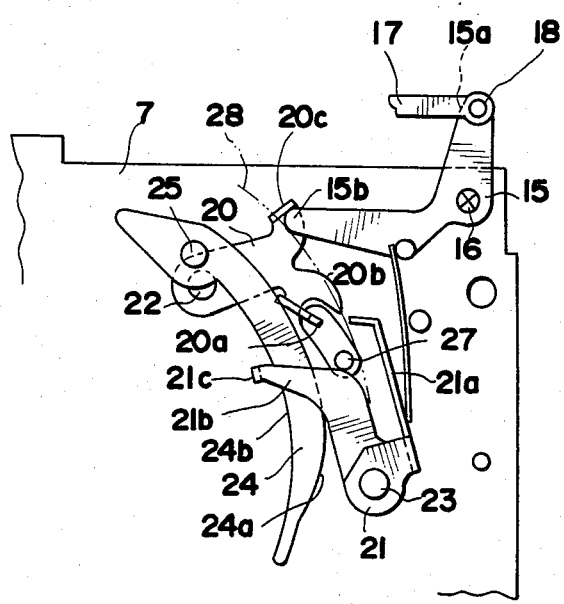
FIG. 2 is a front view of the embodiment shown in FIG. 1.
Figure 3:
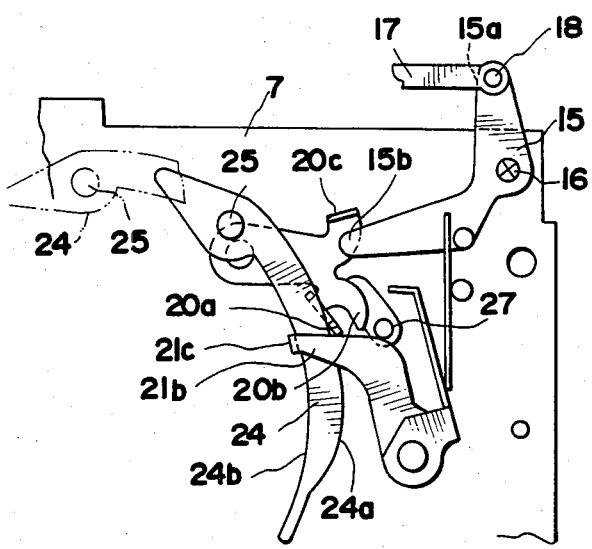
FIG. 3 is a front view of the same embodiment but set to a flash photography mode.

Explanation will now be given about an embodiment of the present invention shown in FIGS. 1 through 4. FIGS. 1 through 3 show an embodiment wherein the present invention is applied to a camera having a built-in electronic flash device and an automatic focussing device. With reference to the Figures, lens block 1 includes a master or photographing lens urged by spring 3 in the counterclockwise direction. When lens cocking member 2 moves to the right, as shown in FIG. 2 (in linked relationship with film wind-up operation), lens block 1 receives pushing force of first pushing piece 2a of lens cocking member 2 at pin 4 (fixed to the block), and is moved to its cocked position against the force of spring 3 with a shutter (not shown) being cocked therewith. Lens cocking member 2 is urged by spring 5 to the left, as viewed in FIG. 1, and is to be restrained by a restraining member (not shown) at a cocked or charge completion position against the force of spring 5 to restrain lens block 1 at a cocked position, as shown in FIG. 1. Guide pin 6 fixed on base plate 7, extends through elongated slot 2b in lens cocking member 2.

Electromagnet 8 for switching the photography mode is comprised of core 8a and bobbin 8b mounted therearound. Core 8a is fixed on a stationary member (not shown) by some suitable fixing member extending through a fixing hole 8c. Armature 9 is disposed to oppose to core 8a and is pivotably mounted by pin 12 on the central portion of armature lever 11 which in turn is pivotably mounted at its base portion by stud 10 on said stationary member (not shown). Spring 13 has its coil portion 13a mounted around stud 10 and its one end portion 13b, extending from coil portion 13a, abuts against pin 14 carried by lever 11 beside the pivoting portion of the lever. The other end portion 13c engages hook portion 11a extending upwards from a side of lever 11, and extends into the path of movement of second pushing piece 2c (formed on lens cocking member 2), in the cocking direction, so that end portion 13c is pushed by second pushing piece 2c to the right, as shown in FIG. 1, at the final stage of the cocking operation of lens cocking member 2 whereby spring 13 urges armature lever 11 in the clockwise direction to abut armature 9 against core 8a of electromagnet 8. It is to be understood that horizontally extending portion 11b of hook portion 11a prevents end portion 13C of spring 13 from disengaging from lever 11 upwardly.

Photography mode switching lever 15 is disposed at the opposite side of electromagnet 8 (from the side thereof facing armature 9), and is pivotably mounted at its central portion by stud 16 on shutter supporting base plate 7. Lever 15 has its end 15a connected through intermediary bar 17 to free end 11c of armature lever 11 so that levers 11 and 15 are interlocked. Intermediary bar 17 is connected with lever 15 by pin 18, and is connected with lever 11 by pin 19. As shown in FIGS. 2 and 3, diaphram control cam lever 20 of the shutter mechanism (not shown) and film sensitivity signal lever 21 are disposed around lens block 1 and have their base portion pivotably mounted on base plate 7 through pins 22 and 23. On a portion of outer circumference of lens block 1 distance cam lever 24 is pivotably mounted at its base portion on pin 25.

Diaphragm control cam lever 20 is urged by spring 26 to the clockwise direction and has formed, at its free end portion, a positioning piece 20a which abuts against cam periphery 24a of distance cam lever under the urging force of spring 26 to determine the position of diaphragm control cam lever 20 in the flash photography mode. Diaphragm control cam lever 20 also has formed, at its free end, a diaphragm control cam 20b which, when diaphragm control cam lever 20 assumes the flash photography position determined by positioning piece 20a and cam periphery 24a, lies in the path of movement of diaphragm control pin 27 of the shutter mechanism to determine the diaphragm aperture in accordance with the setting of camera-to-object distance, i.e. adjustment of a focusing ring (not shown). Diaphragm control cam lever 20 is provided, at its free end, with receiving piece 20c which opposes end portion 15b of photography mode switching lever 15 such that, which lever 15 is in the natural light photography position as shown in FIGS. 1 and 2, end portion 15b of lever 15 pushes receiving piece 20c against the force of spring 26 to retain diaphragm control cam lever at the position where diaphragm control cam 20b has retired from the path of movement of diaphragm control pin 27.

Film sensitivity signal lever 21 is provided with positioning arm 21a which abuts cam periphery 28 of film sensitivity setting member (not shown).

Film sensitivity signal lever 21 is provided with position control arm 21b which controls the rotational or angular position of diaphragm cam lever 24 about pin 25 in accordance with the setting of the film sensitivity, with lever 21 being retained by cam periphery 28 and the positioning piece. Thus, the diaphragm aperture for flash photography is controlled by distance cam lever 24 in accordance with the set film sensitivity as well as the set camera-to-object distance. Engaging piece 21c for the position control of distance cam lever 24, is formed by bending the free end of position control arm 21b and is adapted to engage side 24b of distance cam lever 24 opposite from cam periphery 24a thereof.

Referring back to FIG. 1, switch S1 is adapted to respond to the switching of the photography mode. Switch S1 is composed of fixed contact 30a and movable contact 30b mounted on insulating base plate 29 which is fixed on shutter supporting base plate 7. When photography mode switching member 15 is at the natural light photography mode position as shown in FIGS. 1 and 2, pin 31 carried by member 15 pushes movable contact 30b away from fixed contact 30a to turn off switch S1. Switch S2 is serially connected with a later-to-be-described synchro switch and is composed of fixed contact 33a and movable contact 33b mounted on insulating base plate 32 which is fixed on a base plate (not shown). At the natural light photography mode where armature 9 is urged into contact with or attracted by core 8a of electromagnet 8, movable contact 33b is disengaged by pin 14 on armature lever 11 from fixed contact 33a to turn off switch S2. Daylight synchro switch S3 is usually turned off. It is turned on by the depression of daylight synchro button 34 for flash photography under sufficient ambient light.

Focal length changing member 50 is provided with a wall portion which is provided with rectangular aperture 50a, a lens block including conversion lens 51, and pin 52. Focal length changing member 50 is supported by the camera body to move between a standard lens photography position where aperture 50a is aligned with lens block 1, and a telephoto position where lens block 51 is disposed in front of lens block 1. Switch S7 is composed of contact strips 53a and 53b which tend to be in contact in their free condition. When focal length changing member 50 is at the standard lens photography position thereof, the camera objective is formed by the master lens in lens block 1 to provide a lens system with a focal length for standard lens photography, with contact strip 53a of switch S7 being disengaged by pin 52 from contact strip 53b to open switch S7.

In contrast thereto, when focal length changing member 50 is at the telephoto position thereof, the camera objective is composed of the master lens of lens block 1 and conversion lens of lens block 51 to which together form a lens system with a focal length for telescopic photography, with pin 52 retiring from contact strip 53a allowing contact strips 53a and 53b to come into contact.

Figure 4:
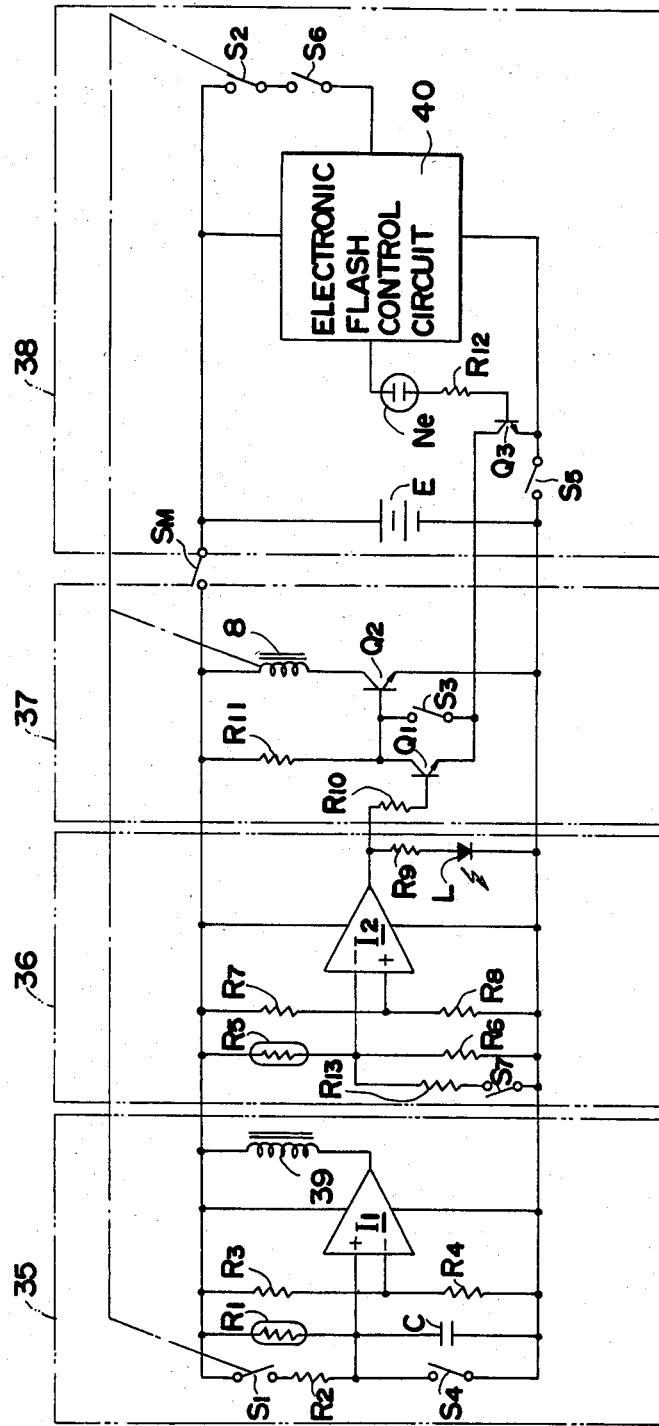
FIG. 4 is a circuit diagram schematically showing an electrical circuit to be coupled with the embodiment shown in FIG. 1.

FIG. 4 shows exposure control circuit 35 associated with the shutter mechanism, low-light level detecting circuit 36 for detecting an object or scene brightness being lower than a given level, photography mode switching circuit 37 for controlling electromagnet 8 for switching the photography mode, and electronic flash circuit 38.

In exposure control circuit 35, R1 represents the resistance of CdS photoconductive or photoresistor cell which detects the brightness of an object or scene to be photographed. When photography mode selection switch S1 is closed resistor R2 is connected in parallel with CdS cell R1 to provide a shutter speed for flash photography. Bleeder resistors R3 and R4 determine the threshold or switching level of switching element I1. Timer capacitor C is serially connected with CdS cell R1. Count switch S4 is connected across timer capacitor C and is opened in response to actuation of the shutter to initiate the charging of capacitor C. Exposure time control magnet 39 is connected to the output of switching element I1 to initiate shutter closing, as is well known in the art.

In low-light level detecting circuit 36, the CdS cell for detecting the brightness of an object or scene to be photographed is connected in series with reference resistor R6. Bleeder resistors R7 and R8 are connected in series, with the node therebetween connected to the non-inverting input of switching element I2, while the inverting input of switching element I2 is connected between CdS cell R5 and resistor R6. Light emitting L for warning of blur-occurring shutter speeds is connected through current limiting resistor R9 to the output of switching element I2.

Photography mode switching circuit 37 is comprised of switching transistors Q1 and Q2 which, in cooperation, energize and de-energize electromagnet 8 for the selection of the photography mode. Transistor Q1 receives at its base the output signal from switching element I2 to be turned on and off by the signal. Daylight synchro switch S3 is connected across the emitter-collector of transistor Q1 to short-circuit therebetween by the closure of the switch, thereby overriding the output of low-light level detection circuit 36 with respect to the turning-on and -off of transistor Q2 during the daylight flash photography.

Resistors R10 and R11 are provided for the control of current to the base and the collector of transistor Q1.

In electronic flash circuit 38, the electric power from power source E is supplied through main switch S5 to electronic flash control circuit 40 which includes a flash tube and a main capacitor for storing energy for the firing of the flash tube. Neon lamp Ne is turned on and lit when the main capacitor has been charged to a given level. Switching transistor Q3, which is turned on upon charge completion of the main capacitor and neon lamp Ne being lit, is connected in series with transistor Q1 and daylight synchro switch S3 in photography mode switching circuit 37 such that transistor Q2 is turned off only when transistor Q3 and either of parallel connected transistor Q1 and switch S3 are turned on. Synchro switch S6 is closed at a given timed relationship with the opening operation of the shutter and is connected with switch S2 as described before. Current limiting resistor R12 is connected between neon lamp Ne and the base of transistor Q3.

Main switch SM is closed by the depression of a shutter release button (not shown) in 2 manner well known in the art, to supply power from power source E to circuits 35, 36 and 37.

Low-light level detecting circuit 36 further comprises series connected auxiliary resistor R13 and switch S7 which are connected in parallel with reference resistor R6. When switch S7 is closed, auxiliary resistor R7 is connected in parallel with reference resistor R6 to lower the level of the signal that corresponds to an object or scene brightness and which is to be applied to the input of switching element I2.

It is to be noted that the shutter is a programmed diaphragm shutter in this embodiment.

Now, explanation will be given about the operation of the photography mode switching device when focal length changing member 50 is in the standard position. In normal photography conditions, such as daylight photography, the electronic flash need not be fired and the picture is taken of an object under the illumination of natural light with main flash switch S5 being open. In this case, during shutter release operation, main switch SM is turned on to supply power from source E to respective circuits 35, 36 and 37. With the releasing of the shutter mechanism, lens cocking member 2 is also released from the restraint to be moved by the force of spring 5 to the left from the position shown in FIG. 1. At the initial stage of this leftward movement, spring 13 is released from the pressure of first pushing piece 2c to release the pressure applied to armature 9 towards core 8a. However, electronic flash circuit 38 is de-energized with its main switch S5 being open so that transistor Q3 is non-conductive. Accordingly, whether the object or scene brightness detected by the low-light level detecting circuit is lower than a given level or not, transistor Q2 in photography mode switching circuit 37 remains conductive to energize electromagnet 8 for the selection of photography mode.

Thus, armature 9 is being attracted by electromagnet 8 and photography mode switch member 15 and diaphragm control cam lever 20 are held at the natural light photography condition as shown in FIGS. 1 and 2 with armature 9 not being pushed away from electromagnet 8 by the force of spring 26, even after the pressure of spring 13 has been released. With this condition, switches S1 and S2 are held open.

As lens cocking member 2 moves to the left, lens block 1 is turned counterclockwise by the force of spring 3 until it is stopped by a range finding mechanism and a lens stopping mechanism of a known automatic focusing device (not shown) at a position commensurate with the detected camera-to-object distance.

When lens cocking member 2 reaches its leftmost terminal position after the completion of above mentioned automatic focusing operation, a shutter release member (not shown) operates to actuate the shutter which is closed by electromagnet 39 of exposure time control circuit 35 to provide a suitable exposure time determined by control circuit 35. In this case, since switch S1 in control circuit 35 is open as described earlier, the exposure time is given by the time constant determined by photoresistor R1 and capacitor C as a function of the object or scene brightness, whereby natural light photography is effected with a suitable exposure being obtained.

Upon natural light photography, when the object or scene brightness is above a given level, switching element I2 generates a "Low" level output signal to de-energize blur-warning light emitting element L, since the voltage given in according with the relationship between the resistance of CdS cell commensurate with the object or scene brightness and the resistance of reference resistor R6, is higher than the voltage given by bleeder resistors R7 and R8. This means that natural light photography will be made under the control of exposure time control circuit 35, with an exposure time short enough to avoid blur. In this case, transistor Q2 is left turned off to de-energize electromagnet 8.

In contrast thereto when an object or scene brightness is lower than the given level, switching element I2 generates a "High" level output to energize blur-warning light emitting element L. Although transistor Q1 is also turned on, transistor Q2 remains conductive to energize photography mode selecting electromagnet 8, since transistor Q3 is left non-conductive by the opening of main switch S6 of electronic flash circuit 38.

Thus, the camera mechanism is still in the natural light photography condition as shown in FIGS. 1 and 2. Thus when object or scene brightness is low with the camera left in the natural light photography condition, warning of a blur-occurring exposure time is made by the energization of light emitting element L. In this case, the user may carry out natural light photography, taking care to avoid the blur.

However, for beginners, such photography will after result in failure due to the blur. To avoid this, the user may close main switch S5 of the electronic flash device, such that electronic flash circuit 38 is supplied with electric power and the charging of the main capacitor in electronic flash control circuit 40 is started immediately. When the charging of the main capacitor is completed, neon lamp Ne is actuated to indicate the charge completion and, at the same time, transistor Q3 is activated to turn off transistor Q2 in cooperation with transistor Q1 that has been turned on, thereby interrupting the power supply to photography mode switching electromagnet 8 to de-energize the latter and release the attraction of armature 9.

Then, photography mode switching lever 15 is released from the retainment by the attractive force of electromagnet 8 through intermediary lever 17 and armature lever 11, allowing diaphragm control cam lever 20 to rotate clockwise under the force of spring 26 to its flash photography mode position as shown in FIG. 3, whereby cam lever 20 determines the diaphragm aperture by its diaphragm control cam 20b to an value in accordance with a set film sensitivity and set camera-to-object distance. At the same time, counterclockwise rotation of photography mode switching lever 15 to the flash photography mode position turns on switch S1 to connect resistor R2 into the delay or timer circuit of exposure time control circuit 35 such that a exposure time suitable for flash photography is obtained. Armature lever 11 turns counterclockwise from the position shown in FIG. 1 to turn on switch S2.

With the above operation, the camera is switched to the flash photography mode whereby, when shutter release operation is made after light emitting element Ne has been turned on, the electronic flash is fired to bring about flash photography without the anxiety of blur. However, the above operation requires that manual operation be switched to the flash photography mode. Thus, it is not convenient in that the user has to switch the camera to the flash photography mode, observing the warning of a blur-occurring shutter speed by the energization of the light emitting element upon or after he starts photography, whereupon he might lose a photography chance although photography can be effected without the blur. To cope with such a problem, the user should manually close main switch S5 of the electronic flash when he or she wishes that either natural light or flash photography be effected in accordance with an object or scene brightness. With this manual operation, electronic flash circuit 38 is always in a power-supplied condition and transistor Q3 is turned on with neon lamp Ne being energized when the charging of the main capacitor has been completed. Under this condition, when main switch SM is closed in conjunction with a shutter release operation, an object or scene brightness is detected to determine the photography mode. When the object or scene brightness is higher than the given level, switching element I2 in low brightness detecting circuit 36 generates a "Low" level signal which turns off transistor Q1 to leave transistor Q2 conductive irrespectively of the conductive state of transistor Q3, thereby allowing electromagnet 8 to remain attracting armature 9. Hence, natural light photography is effected. When an object or scene brightness is lower than the given level, switching element I2 generates a "High" level signal, which energizes light-emitting element L and at the same time turns on transistor Q1, which turns off transistor Q2 in cooperation with transistor Q3 in conductive state, thereby de-energizing electromagnet 8 and releasing its attraction of armature 9.

Then, when lens cocking member 2 moves to the left as viewed in FIG. 1 in response to shutter release operation, the camera mechanism is switched to the flash photography mode whereby the electronic flash never fails to be fired in conjunction with the subsequent opening operation of the shutter, enabling spontaneous photography without the loss of photography chances and without blurred pictures.

Further, in the case shutter release operation is made immediately after the closure of main switch S5 of electronic flash circuit or just after the previous flash photography, with the charging of the main capacitor having not been completed and neon lamp Ne remaining de-energized, transistor Q3 still remains non-conductive and electromagnet 8 attracts armature 9 due to the conduction of transistor Q2, whereby natural light photography is effected even if the object or scene brightness is lowr than the given level.

The components that have been released in the photography operation are cocked in conjunction with the film wind-up operation for subsequent photography.

In the case of a back-lighted scene, for example, with the camera being directed towards the sun or a window and the main object being shadowed, the electronic flash function may be desired even if the object and/or scene brightness is higher than a given level. To this end, daylight synchro button 34 should be operated to close daylight synchro switch S3 to short-circuit across the emitter-collector of transistor Q1 to effect the state of transistor Q1 being turned on, thereby making inoperative the output signal from low-brightness detecting circuit 36 with respect to its effect on photography mode switching circuit 37. Then, with only the condition where the main capacitor in electronic flash circuit 38 has been changed to turn on transistor Q3, transistor Q2 is turned off to release the attraction of armature 9 by electromagnet 8 to enable flash photography. However, in exposure time control circuit 35, the resistor of the CdS cell, as well as auxiliary resistor R2, is effective and the exposure time is automatically controlled in accordance with the object or scene brightness which is higher than the given level.

When focal length changing member 50 is shifted from the standard lens photography position to the telephoto position, the camera objective is composed of the master lens in lens block 1 and the conversion lens in block 51 to provide a focal length for telescopic photography. At the same time, switch S7 is closed with pin 52 having retired therefrom, whereby the signal level to be applied to the input of switching element I2 in correspondence with the object or scene brightness is lowered. Consequently, switching element I2 generates a "High" level output signal for an object or scene brightness at which, in the case of standard lens photography, swiching element I2 will generate a "Low" level output signal. Thus, the camera is switched to the flash mode at an object or scene brightness that is higher than the brightness required to switch to the flash photography mode at the time of standard lens photography. As the result, the chance of blur occurrence will be lessened even in the case of telescopic photography.

It will be easily understood to those skilled in the art that the present invention may be applied to the camera wherein the focusing is manually adjusted. In that case, the armature lever may be arranged to start its travel in response to shutter release operation and return to the armature attracted position in conjunction with the cocking of a pretravelling member, which is adapted to release the shutter during its travelling.

What is claimed is:

1. A camera switchable between a natural light photography mode and a flash photography mode, comprising:
    an objective lens device the focal length of which is changeable;
    a low brightness condition detecting means for detecting a brightness condition of an object to generate a low brightness signal upon detection of a low brightness condition;
    a switching means for switching said camera from the natural light photography mode to the flash photography mode in response to the low brightness signal;
    a control means for causing said detecting means to generate the signal at different brightness conditions in accordance with the change in the focal length so that the switching of said camera to the flash photography mode is effected with a higher brightness condition in the case of a longer focal length;
    an electronic flash control circuit including means for charging and storing electric energy for flash photography; and means for disabling the switching of said camera by said switching means to the flash photography mode until the charge on said storing means has been completed.

2. A camera as defined in claim 1, wherein said low brightness condition detecting means includes a brightness condition detecting circuit for detecting a brightness condition of an object to generate a brightness condition signal;
    a reference signal generator for generating a reference signal; and
    a means for comparing the brightness condition signal with the reference signal to generate the low brightness signal when the brightness condition signal represents a given relationship to the reference signal.

3. A camera as defined in claim 2, wherein said control means includes a circuit for changing the relation between said brightness condition signal and said reference signal.

4. A camera as defined in claim 2, wherein said brightness condition detecting means includes a photoconductive cell for detecting the brightness of an object and a first resistor connected in series with said cell.

5. A camera as defined in claim 4, wherein said control means includes a switching member and second resistor connected in series with said switching member and said photoconductive cell and in parallel with said first resistor, said switching member being switched from a nonconductive condition to a conductive condition in response to the change of the focal length to a longer length.

6. A camera as defined in claim 1, wherein said objective lens device includes a master lens and a conversion lens supported movably between a first position wherein said conversion lens is out of register with said master lens and a second position wherein said conversion lens is in register with said master lens, said conversion lens lengthening the focal length of said objective lens device when it is in said second position.

7. A camera including a first circuit for daylight photography and a second circuit for flash photography, said first and second circuits being alternatively actuated, said camera comprising:
    an objective lens device of adjustable focal length;
    detecting means for detecting the brightness of an object to be photographed and generating a predetermined signal when the brightness of the object is below a predetermined brightness;
    means for compensating said detecting means so that said detecting means generates said predetermined signal even when it detects the brightness which is higher by a predetermined amount than said predetermined brightness, said means being actuated in response to an increase in the focal length of said objective lens device;
    actuating means for alternatively actuating said first and second circuits, said actuating means being capable of actuating said second circuit in response to said predetermined signal;
    an electronic flash circuit including means for charging and storing electric energy for flash photography; and
    control means for disabling said actuating means from actuating said second circuit until said charging and storing have been completed.

* * * * *